United States Patent [19]
Johnson et al.

[11] Patent Number: 5,618,475
[45] Date of Patent: Apr. 8, 1997

[54] EVAPORATOR APPARATUS AND METHOD FOR MAKING NANOPARTICLES

[75] Inventors: D. Lynn Johnson; Vinayak P. Dravid, both of Evanston, Ill.

[73] Assignee: Northwestern University, Evanston, Ill.

[21] Appl. No.: 557,206

[22] Filed: Nov. 14, 1995

Related U.S. Application Data

[63] Continuation-in-part of Ser. No. 330,326, Oct. 27, 1994, Pat. No. 5,472,749.

[51] Int. Cl.$^6$ ................................................. B29B 9/00
[52] U.S. Cl. ........................... 264/10; 264/5; 425/6
[58] Field of Search ........................... 264/5, 10, 403, 264/404, 12; 425/6, 174, 174.8 R

[56] References Cited

U.S. PATENT DOCUMENTS

| | | | |
|---|---|---|---|
| 610,718 | 9/1986 | Araya et al. | 75/0.5 |
| 4,689,075 | 8/1987 | Uda et al. | 264/5 |
| 5,344,676 | 9/1994 | Kim et al. | 264/10 |

OTHER PUBLICATIONS

Synthesis of Nanostructured Materials by the Use of a Termophoretic Forced Flux System; Scripta Metallurgica, vol. 28, No. 6, pp. 721–724. 1993.
Nanophase Materials Assembled From Atomic Clusters; MRS Bulletin Oct., 1990, pp. 60–67, Richard W. Siegel.
Generation of Molecular Clusters of Controlled Size; Surface Science 106 (1981), pp. 117–124; R.S. Bowles, et al.
Nanocrystalline Materials; Progress in Materials Science, vol. 33, pp. 223–315, 1989, H. Gleiter.
Studies of Ultrafine Particles in Japan: Crystallography. Methods of Preparation and Technological Applications; Progress in Materials Science, vol. 35, pp. 1–96, 1991, Ryozi Uyeda.

Primary Examiner—Mary Lynn Theisen
Attorney, Agent, or Firm—Edward J. Timmer

[57] ABSTRACT

Nanoparticles of a material less than about 100 nm in diameter are made by evaporating the material in an evaporation chamber residing in an entrainment chamber having a gaseous atmosphere therein. The evaporator is disposed in but isolated from the entrainment chamber, except for a gaseous jet discharge opening. A carrier gas is introduced to the evaporation chamber to carry vapor of the material in the evaporation chamber through the discharge opening into the entrainment chamber as a gaseous jet. The gaseous jet entrains the gaseous atmosphere for quenching the vapor to form nanoparticles. Solid material is supplied at a feedrate to a supply opening of the evaporation chamber, melted at an end region remote from the supply opening, and evaporated at the end region at an evaporation rate equal to the feed rate of the solid material. First and second metals having different vapor pressures can be supplied to respective first and second evaporation chambers and their vapors collected in a common vapor collection chamber having the discharge opening therein. The carrier gas is introduced to the vapor collection chamber to carry the metal vapors together through the discharge opening as a gaseous jet into the entrainment chamber where nanoparticles comprising the two metals are formed.

30 Claims, 2 Drawing Sheets

EVAPORATOR APPARATUS AND METHOD FOR MAKING NANOPARTICLES

CONTRACTUAL ORIGIN OF THE INVENTION

The United States Government has rights in this invention pursuant to National Science Foundation Grant DMR-9202574.

This application is a continuation-in-part of copending parent application Ser. No. 330 326 filed Oct. 27, 1994, now U.S. Pat. No. 5,472,749.

FIELD OF THE INVENTION

This invention relates to production of particulates having nanoparticle dimensions, such as about 100 nanometers diameter or less, and, more particularly, to apparatus and method for producing nanoparticles of metals, alloys, intermetallics, ceramics, and other materials by quench condensation of a high temperature vapor generated by an evaporator having features effective to isolate evaporation conditions from downstream conditions and to concurrently evaporate materials of dissimilar vapor pressures.

BACKGROUND OF THE INVENTION

Nanoparticles, i.e. particles with physical size (diameter) of about 100 nanometers (nm) diameter or less, typically less than 50 nm diameter, possess important technological properties ranging from superior mechanical behavior to novel electronic and magnetic properties by virtue of their nanocrystalline or other nano-scale microstructural features. Unfortunately, nanoparticles, by virtue of their size and high surface area, are very reactive and interact with their surroundings quickly. For example, metal nanoparticles tend to oxidize rapidly when exposed to air. The desirability of the encapsulation of nanoparticles of metals inside graphite shells has been recognized. For instance, magnetic materials (such as metallic nickel, iron, cobalt or cobalt-chromium alloy) encapsulated inside graphite shells can find applications as recording media, ferro fluids or magnetic tagging elements. These nanocapsules may be injected into biological systems for use as a drug or a tracing delivery and monitoring system. These particulate materials may also find applications in electronic and optoelectronic industries by virtue of their small particle size, which would give rise to novel quantum phenomena. The encapsulated nanoparticles may be consolidated or dispersed in a matrix to form interpenetrated composites which will have applications in areas which require better mechanical properties or unique electronic and magnetic properties.

Generally the prior art synthesis methods utilize an arc between two graphite electrodes in which one electrode (the anode) is a mixture of graphite and the material to be encapsulated, and the other electrode (the cathode) is graphite. Such a process generally results in isolated instances of encapsulation with a low yield.

Furthermore, the process also produces a lot of empty graphite shells, graphite flakes, amorphous debris and graphite nanotubes which are difficult to separate from those which encapsulate the material of interest.

Other methods suffer from surface contamination by impurities, which can greatly change the desired properties of a bulk sample. The inert gas vapor condensation method is one of the cleanest ways to produce nanophase materials. Because the material is physically evaporated in the absence of any precursors, there are no contaminants left on the surface of the nanoparticles, which eliminates a common problem with chemical methods. However, typically either the particle size is too large, the production rate is too low, or both using these techniques. Heating methods include electrical resistance heaters, arc discharge, laser heating, and electron beam heating. In traditional resistance heated evaporators, the vapor is formed in a partial vacuum above an open crucible or boat and allowed to rise from the molten pool by convection. Low evaporation rates and low pressures are required to yield small particles, resulting in low rates of production of nanoparticles. In the arc heating method, a flow of gas at atmospheric pressure is passed through the arc chamber to carry the condensed particles away from the arc, but the average particle size tends to be substantially large with respect to nanoparticle range; e.g. larger than 20 nm.

Traditional evaporators also suffer from the disadvantage that two metals with disparate vapor pressures cannot be vaporized simultaneously at the arbitrary relative rates required to form alloy, intermetallic, or other compound particles of specific composition. Even when two metals are evaporated simultaneously by two heating devices in the same chamber, the two vapors condense separately such that composition control is difficult, and the resulting particles are a mixture of two particle types of different composition. Electron beam heating has been utilized in an attempt to evaporate two metals simultaneously, but the results have been sporadic with control of composition being difficult and imprecise.

The production of oxide nanosize powder particles from metal vapors traditionally has been effected by first collecting the metal nanoparticles and then allowing them to oxidize on the collector. Among other problems, the oxidized particles are agglomerated as a result of the metal nanoparticles being agglomerated prior to oxidation.

Copending application Ser. No. 330 326 of common assignee herewith describes a method of encapsulating nanoparticles in a graphite shell that overcomes the shortcomings and problems experienced by the prior art discussed hereabove. The method employs a tungsten arc method wherein an arc chamber is filled with an inert or reducing gas and a tungsten rod is used as a non-consumable cathode. The anode comprises the material, such as a metal, alloy, etc., which is to be formed into nanoparticles. The anode material is contained in a graphite crucible and is vaporized by the electric arc established between the anode and the non-consumable cathode. The high temperature vapor of the anode material is rapidly quenched by directing a jet of helium or other inert gas transversely through the electric arc and vapor plume produced thereby. The rapid quenching of the vapor produces nanoparticles coated with graphite that are collected for further processing.

An object of the present invention is to provide for the production of nanoparticles by quench condensation of a high temperature vapor generated and discharged by an evaporator having features effective to isolate evaporation conditions from downstream conditions.

A further object of the present invention is to provide for the production of nanoparticles of controlled, multi-element composition by quench condensation of a high temperature vapor generated by an evaporator capable of concurrent evaporation of materials of dissimilar or similar vapor pressures.

Still a further object of the subject invention is to provide for the production of nanoparticles comprising ceramic and other compounds by quench condensation of a high temperature vapor generated by an evaporator and discharged as a jet to a reactive atmosphere reactive with the evaporated element(s) present in the high temperature vapor.

SUMMARY OF THE INVENTION

The present invention provides method and apparatus for forming nanoparticles of metal, alloy, intermetallic, ceramic, and other materials. Apparatus in accordance with an embodiment of the invention comprises a chamber having a gaseous atmosphere therein and an evaporator having an evaporation chamber communicated to the chamber by an evaporator discharge opening. Means is provided for heating the material in the evaporation chamber to generate vapor of the material therein proximate the discharge opening. Means also is provided for supplying carrier gas to the evaporation chamber in a manner to carry the vapor through the discharge opening into the chamber as a gaseous jet that entrains the gaseous atmosphere for quenching the vapor to form nanoparticles in the jet. The carrier gas typically is inert, neutral or otherwise non-reactive with the vapor. The gaseous atmosphere in the chamber optionally can be reactive with the vapor to form particle compounds, particle coatings, and composite particles. To this end, the gaseous atmosphere can include a reactant selected from the group consisting of oxygen-bearing gas, carbon-bearing gas, nitrogen-bearing gas, and boron-bearing gas.

An evaporator in accordance with one embodiment of the invention comprises a tubular evaporator housing having a lower supply opening to which solid material is supplied for melting and evaporation in the evaporation chamber at a region remote from said supply opening. Heating means is provided for heating the evaporator housing in a manner to establish a temperature gradient therealong to provide a melted region of the material proximate the discharge opening and a solid region of the material proximate the supply opening. The discharge opening is disposed above a melted region of the solid material. The evaporation chamber is communicated to the carrier gas supply means at a location above the discharge opening.

In a particular embodiment of the invention for evaporating two materials having dissimilar vapor pressures, the evaporator housing comprises an inverted Y-shape tube having first and second lower tubular sections communicated at a junction to a common third upper tubular vapor collection section. The first and second tubular sections include respective lower regions to which respective first and second materials are supplied. First and second heating means are provided for heating the respective first and second tubular sections and their common junction to generate a first vapor comprising the first material in the first tubular section and a second vapor comprising the second material in the second tubular section. At a given temperature of the common junction, the evaporation rates of the metals correspond to their respective feedrates to the first and second evaporation chambers. The vapor collection tubular section includes an upper region communicated to the carrier gas supply means and a jet discharge opening disposed proximate the common junction such that the carrier gas sweeps the first and second vapors together through the discharge opening as a gaseous jet into the entrainment chamber.

In another particular embodiment of the invention, the evaporator includes a second outer tubular housing disposed about the evaporator housing when the gaseous atmosphere present in the entrainment chamber is adversely reactive with the evaporator housing. The second housing includes a second discharge opening in registry with the evaporator discharge opening for discharging the gaseous jet through the second discharge opening to the entrainment chamber. The second housing comprises a material different from that of the evaporator housing and substantially non-reactive with the gaseous atmosphere in the entrainment chamber. For example, the evaporator housing can comprise a carbon based material, such a graphite, while the second housing comprises a ceramic material, such as alumina, magnesia, zirconia, and the like. The flow rate of carrier gas through the discharge openings and the small size of the discharge openings substantially prevent the reactive atmosphere from contacting the evaporator housing.

The above and other objects of the present invention will become apparent from the following detailed description of the invention taken with the following drawings.

DESCRIPTION OF THE INVENTION

Figure 1:
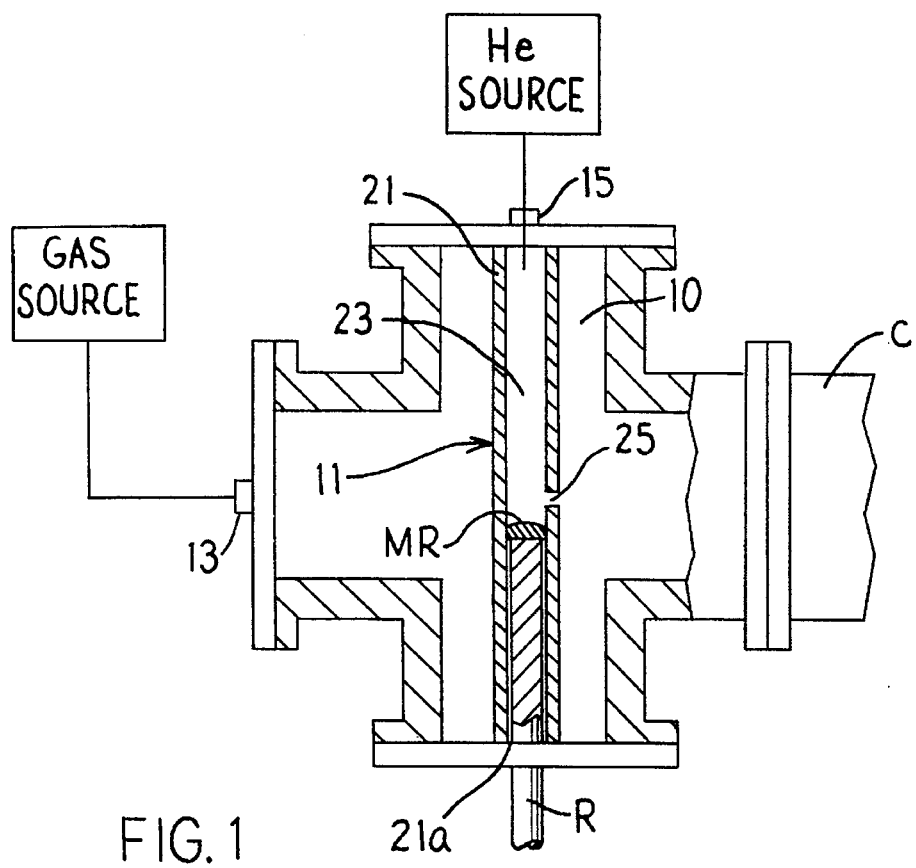
FIGS. 1 and 2 are schematic views of apparatus of an embodiment of the invention for making nanoparticles with the entrainment chamber housing broken away to reveal inner components.
Figure 2A:
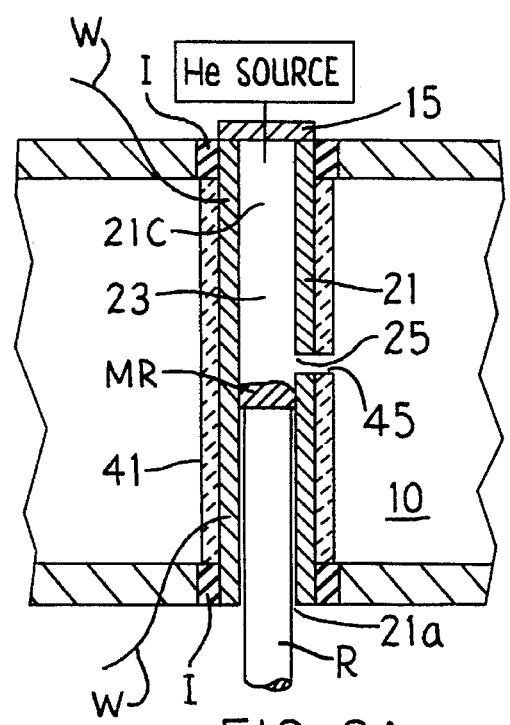
FIG. 2A is a fragmentary schematic view of an apparatus embodiment wherein the evaporator includes a protective outer tubular housing when the atmosphere in the entrainment chamber is reactive toward the evaporator housing.
Figure 2:
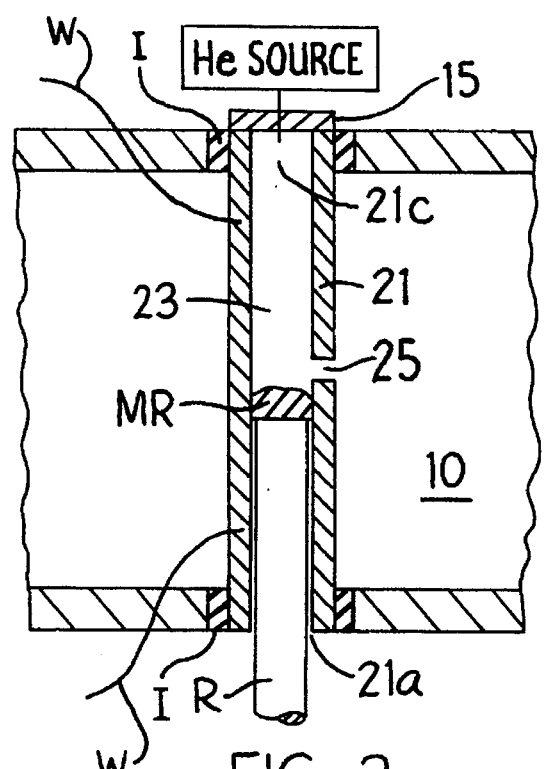

Referring to FIGS. 1–2, apparatus in accordance with an embodiment of the invention is shown for forming nanoparticles of a material, which may comprise a metal, alloy, intermetallic, ceramic, and other materials by quench condensation of a high temperature vapor of the material. The apparatus can be used to make uncoated nanoparticles of the material, nanoparticles that are coated with another material such as graphite, oxide, carbide, nitride, or other protective or functional coatings, nanoparticles that are converted by reaction from one material to another, such as from a metal to a compound of the metal such as a metal oxide, carbide, nitride, composite nanoparticles that include compound dispersoids therein, and the like. The apparatus of FIG. 3 can be used to make nanoparticles that comprise two or more materials, such as alloys, intermetallics, ceramics and composite particles wherein multiple materials are concurrently evaporated and the resulting high temperature vapor subjected to quench condensation to form nanoparticles.

Referring to FIGS. 1–2, apparatus is shown schematically as comprising a first entrainment chamber 10 for receiving an evaporator 11 in which material is heated and evaporated to form a high temperature vapor that is discharged as a gaseous jet into the chamber 10. The gaseous jet with nanoparticles preferably is directed through a chamber C to a downstream chamber (not shown) for particle collection or reaction. The entrainment chamber 10 includes a gaseous atmosphere which may be non-reactive with the high temperature vapor or, optionally, may be reactive with the vapor. For example, the entrainment atmosphere can be comprise a non-reactive inert gas (e.g. helium), a neutral gas (e.g. nitrogen), or a reducing gas (e.g. hydrogen) supplied to the chamber 10 from a suitable source means, such as a conventional gas bottle or cylinder communicated to the chamber 10 at a gas inlet fitting 13.

Alternately, the entrainment atmosphere in chamber 10 can include a reactant selected from the group consisting of O-bearing gas (e.g. oxygen), C-bearing gas (e.g. methane), N-bearing gas (e.g. nitrogen), and B-bearing gas (e.g. borane) to react with the vapor of the gaseous jet from the evaporator 11 to form particle coatings (oxide, carbide, nitride, boride coatings), particle compounds (oxide, carbide, nitride, boride particles), composite particles (oxide, carbide, nitride, boride dispersoids in a metal particle matrix), and the like.

Still further, the atmosphere in chamber 10 can include a component, such as a precursor, that is effective to deposit a coating or encapsulant on the nanoparticles formed in the chamber 10.

As will be explained further herebelow, the gaseous jet from the evaporator 11 is discharged to the entrainment chamber 10 where the jet entrains the gaseous atmosphere in chamber 10 to quench the vapor and form nanoparticles in the jet. In the event the gaseous atmosphere in chamber 10 is non-reactive with the vapor, the unreacted nanoparticles can be collected in a downstream collection chamber (not shown) if desired.

Alternately, nanoparticles formed in chamber 10 and not reacted therein can be further treated by directing the second stage jet to flow through chamber C to a downstream aerosol reaction chamber (not shown) to form particle coatings, compound particles, composite particles and the like (similar to those that can be formed in chamber 10 using a reactive gaseous atmosphere) and then collected in a collection chamber (not shown) farther downstream of the aerosol reaction chamber, for example, in a manner described in copending patent application Ser. No. 081557, 304 entitled "NANOPARTICLE SYNTHESIS APPARATUS AND METHOD"(attorney docket No. NUNIV 336) of common assignee, the teachings of which are incorporated herein with respect to such downstream reaction and collection chambers.

An evaporator 11 in accordance with an embodiment of the present invention is shown comprising a tubular evaporator housing 21 having an evaporation chamber 23 therein and a gaseous jet discharge opening 25. As shown, the evaporator housing 21 is disposed in the chamber 10 and communicates therewith via the relatively small discharge opening 25. By maintaining suitable carrier gas flow to the evaporation chamber 23 and suitably small size of discharge opening, the evaporation conditions established in chamber 23 can be effectively isolated from the conditions in the entrainment chamber 10 so that the gaseous atmosphere in chamber 10 can include the reactants and/or precursors described hereabove without adversely affecting the conditions of evaporation established in the evaporator 11.

The tubular evaporation housing 21 can comprises a ceramic material such as $Al_2O_3$, $MgO$, and $ZrO_2$, or alternately a carbon based material, such as graphite or amorphous carbon as further discussed herebelow.

Solid material to be evaporated is supplied to the evaporation housing 21 via a lower open end region (supply opening) 21a. For a cylindrical tubular housing 21, the feedstock can comprise a cylindrical rod or wire R of the material to be evaporated in the evaporation chamber 23. The rod or wire can be fed to the evaporation chamber 23 by a suitable screw feed system or other conventional rod or wire feeding device (not shown). As will be explained herebelow, the evaporation rate of the material in the evaporation chamber 23 can correspond to the feed rate of the rod or wire R to the chamber 23.

The solid material supplied to supply opening 21a may comprise two different metals or materials having similar vapor pressures. For example, two different metal rods or wires can be concurrently supplied to the supply opening 21a. Alternately, an alloy or composite rod or wire comprising the two metals can be fed to supply opening 21a. Nanoparticles comprising an alloy of the two metals or compounds of the two metals with one another or with a reactant (e.g. oxygen in chamber 10) can thereby be formed.

When the evaporation housing 21 comprises a carbon based material, such as graphite or amorphous carbon, the housing 21 can be heated by passing an electrical current (e.g. AC or DC electrical current) therethrough via electrical lead wires W, or by induction via a conventional induction coil (not shown) disposed about the housing. For example, referring to FIG. 2, electrical current can be supplied to lead wires W to pass current through the tubular evaporator housing 21 in a manner to establish a temperature gradient along the length of the housing 21 effective to provide a melted region (melt pool) MR of the rod or wire material proximate the discharge opening 25 from which metal evaporates and a solid region of the rod or wire material proximate the supply opening 21a. Housing 21 is electrically insulated by insulators I from the metal housing defining chamber 10. Alternately, the carbon based evaporation housing 21 can be heated by one or more induction coils (not shown) disposed about the housing 21 to provide a similar temperature gradient to form the melt/evaporation pool MR proximate the discharge opening 25 and remote from the supply opening 21a.

When a carbon based evaporation housing 21 is used in the practice of the invention, graphite encapsulated nanoparticles can be formed in chamber 10 by quench condensation of the gaseous jet. In particular, heating of the carbon based evaporation housing 21 in the manner described can be controlled to provide a controlled amount of carbon vapor in the evaporation chamber 23 and discharged jet for encapsulating the nanoparticles formed in chamber 10. The present invention thereby can provide close control of both metal vapor and carbon vapor in evaporation chamber 23 to provide controlled encapsulation of the nanoparticles with reduced excess carbon.

When the evaporation housing 21 comprises ceramic material, such as alumina, magnesia, zirconia, etc., one or more conventional electrical resistance heaters (not shown) can be provided about the evaporation housing 21 in a manner to provide a temperature gradient of the type described in the preceding paragraph along the length of the housing 21.

The molten pool MR that forms on the end of the rod or wire R will tend to evaporate at an evaporation rate that will increase as the temperature of the molten material increases. The level of the melt MR will rise in the tubular housing 21 until the evaporation rate equals the feed rate of the rod or wire R to supply opening 21a. Thus, temperature of melt MR can be controlled to provide an evaporation rate that will be equal to the mass feed rate of rod or wire to the evaporation chamber 23. The level of the melt MR will be self-stabilizing at a given temperature because of this balance of evaporation and feed rate.

The vapor of the material rises and collects in the chamber 23 above the melt pool MR proximate the discharge opening 25. The upper open end region 21c of the tubular evaporator housing 21 is communicated to carrier gas supply means, such as a conventional bottle or cylinder of gas, via gas inlet fitting 15 disposed above the evaporation chamber 23 and discharge opening 25 The carrier gas typically comprises inert (helium) gas, neutral (nitrogen) gas, reducing (hydrogen) gas or other gas non-reactive to the vapor. The carrier gas is provided at room temperature and a flow rate to evaporation chamber 23 to sweep and carry the vapor generated and collected in the evaporation chamber 23 through the discharge opening 25 as a gaseous jet into the entrainment chamber 10.

The gaseous jet discharged from the discharge opening 25 comprises the carrier gas and vapor of the rod or wire material and optional carbon (or other material) from the evaporator housing. The gaseous jet can be directed by the orientation of the discharge opening 25 to flow through chamber C in a direction to a downstream collection chamber (not shown) or downstream reaction chamber (not shown) as described in aforementioned copending application entitled "NANOPARTICLE SYNTHESIS APPARATUS AND METHOD"(docket No. NUNIV 336), the teachings of which are incorporated herein by reference with respect to such collection and reaction chambers. As the gaseous jet flows toward the chamber C, the jet entrains a portion of the gaseous atmosphere present in the chamber 10 for quenching the vapor to form nanoparticles and also to carry the nanoparticles so formed as an aerosol stream or flow through the chamber C. The aerosol stream or flow in chamber 10 comprises a gaseous jet containing the entrainment gas from chamber 10 and nanoparticles formed from the vapor.

The carrier gas and entrained gaseous atmosphere in chamber 10 rapidly quench the vapor in chamber 10 so as to nucleate and grow nanosize particles therefrom. The velocity (flow rate) of the carrier gas jet discharged from discharge opening 25 controls the size of the particles formed from the vapor. The flow rate of the carrier gas introduced to the evaporation chamber 23 is controlled by a conventional gas flow meter or mass flow controller in order to vary velocity of the gaseous quenching jet discharged to chamber 10.

The particle size and particle production rate will depend on various parameters including the temperature of the molten pool MR from which the material evaporates in the evaporator 11, the velocity, mass flow, and cross-sectional area and shape of the gaseous quenching jet discharged from discharge opening 25, the mass flow of the entrainment gas atmosphere introduced to the first chamber 10, and the overall pressure in the system. In general, lower pressure, higher quenching jet velocity and higher entrainment gas flow rate result in smaller particles. Production rate depends on the temperature of the molten pool MR of material in the evaporator 11 since this governs the evaporation rate of the material.

Referring to FIG. 2A, another embodiment of the invention is shown wherein the evaporator 11 includes the tubular evaporator housing 21 having discharge opening 25 and a second outer tubular housing 41 disposed in chamber 10 about and encompassing the inner housing 20. In FIG. 2A, like reference numerals are used to designate like features of FIG. 1.

The second housing 41 includes a discharge opening 45 registered or aligned with opening 25 to permit discharge of the gaseous jet from the evaporator 12 to the chamber 10. This embodiment is useful when the atmosphere of the chamber 10 is adversely reactive to material of the evaporator housing 21 at the elevated temperatures involved. For example a carbon based evaporator housing 21 may be overly reactive with an oxygen-bearing atmosphere in chamber 10 when oxide particle coatings or oxide particles are produced. In this event, the second housing 41 is provided as a protective housing about the inner evaporator housing 21 to reduce or prevent reaction thereof with the atmosphere in chamber 10. In particular, the second housing 41 can comprise a material different from that of the evaporator housing 21 and substantially non-reactive with the gaseous atmosphere in the chamber 10. For example, the inner evaporator housing 21 can be a carbon material, such as graphite or amorphous carbon, while the second outer housing 41 can be a ceramic material, such as alumina, magnesia, zirconia, etc. Moreover, the carrier gas flow rate to the evaporator housing 21 and thus through discharge openings 25, 45 is controlled at a level that prevents entry of the reactive atmosphere in chamber 10 into the evaporator housing 21, thereby isolating the evaporator housing 21 and evaporation conditions therein from the reactive atmosphere in chamber 10.

Figure 3:
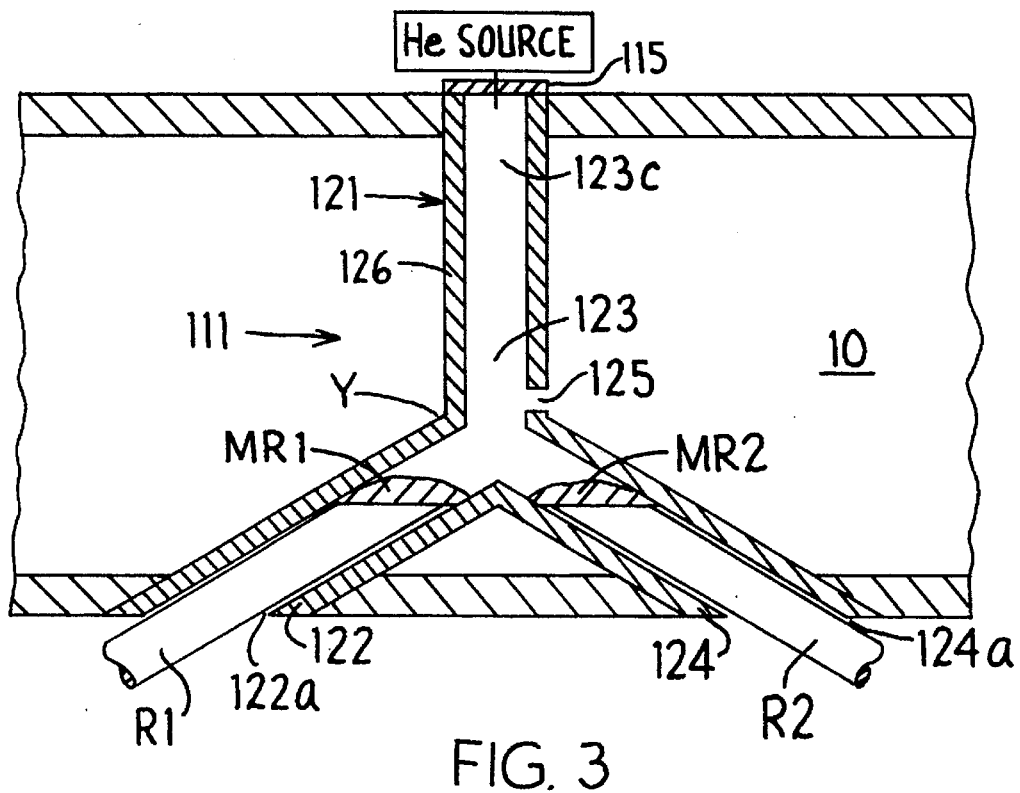
FIG. 3 is a similar fragmentary schematic view of an apparatus embodiment of the invention using an inverted Y-shaped evaporator tube for evaporating two materials having dissimilar vapor pressures.

Referring to FIG. 3, apparatus in accordance with another embodiment of the invention is shown for forming nanoparticles comprising two materials, such as two metals, by quench condensation of a high temperature vapor of the materials. In particular, FIG. 3 differs from FIG. 1 in having evaporator 111 disposed in entrainment chamber 10 wherein the evaporator is configured to concurrently evaporate two metals having substantially dissimilar vapor pressures.

The evaporator 111 comprises an evaporator housing 121 having an inverted-Y tubular shape comprising first and second lower tubular sections 122, 124 communicated at a common junction Y to a common third upper tubular vapor collection section 126 having a vapor collection chamber 123. The first and second tubular sections 122, 124 have a respective lower open region (supply opening) 122a, 124a to which a respective first and second rod or wire R1, R2 of each metal is supplied in the manner described hereabove for the evaporator 11.

First and second heating means are provided for heating the respective first and second tubular sections 122, 124 to generate a first vapor comprising the first metal in the first tubular section 122 and a second vapor comprising the second metal in the second tubular section 124. The heating means can comprise electrical lead wires (not shown but like wires W described hereabove for FIG. 2) for passing electrical current through the tubular sections 122, 124, which would be electrically insulated from the surrounding housing of chamber 10 as described above, in a manner to establish a temperature gradient along the length of each section 122, 124 effective to provide independent melted regions (melt pools) MR1, MR2 of the first and second metal rods proximate the discharge opening 125 and a solid region of the first and second metal rods proximate the supply openings 122a, 124a. The temperature of the junction Y of the tubular sections 122, 124 and tubular section 126 is maintained at a temperature well above the melting point of higher melting point metal in sections 122, 124. The housing temperature is maintained well above the higher melting point temperature at junction Y so as to melt the end region of each rod or wire R1, R2, thereby forming melt pools MR1, MR2 from which evaporation occurs concurrently. Alternately, other heating means like those described hereabove for evaporator 11 can be used to this end.

At a given junction temperature, the metals will concurrently evaporate from the molten pools MR1, MR2 in the tubular sections 122,124 at respective evaporation rates corresponding to the feed rates of the respective rods or wires R1, R2 to the tubular sections 122, 124. That is, the level of molten metal in each tubular section 122, 124 will adjust itself at the proper temperature such that the evaporation rate will equal the feed rate of each metal. The evaporator 111 is self-regulating in this regard so long as the feed rates of the two metals are maintained within the bounds of possible evaporation rates.

Thus, the collected vapor in the vapor collection chamber 123 will contain a ratio of the two metals equal to the ratio of the mass feed rates of the two metal to tubular sections 122, 124. Nanoparticles thereby can be formed in chamber 10 by quench condensation as described hereabove and will have close control over the relative proportions of the two metals present in the particle composition as well as the size of the particles. Particles comprising alloys, compounds, and composites can be formed in chamber 10 as a result.

The tubular sections 122, 124 are communicated to the vapor collection section 126 such that the two metal vapors are collected in chamber 123. The vapor collection chamber 123 includes an upper region 123c communicated to the carrier gas inlet fitting 115 and the discharge opening 125 disposed proximate the junction Y so that the carrier gas carries the first and second vapors together through the discharge opening 125 as a gaseous jet into the entrainment chamber 10 for quenching as described to form nanoparticles in the entrained jet for collection as also described hereabove.

When the entrainment chamber 10 contains a gaseous atmosphere reactive with the tubular sections 122, 124, 126, the evaporator 111 of FIG. 3 may include a second outer protective housing (not shown but similar to outer housing 41 of FIG. 2A) disposed about the third tubular sections in a manner similar to that described hereabove for evaporator 11 with the second housing having a discharge opening in registry with the discharge opening 125 of the tubular section 126 and with flow rate of the carrier gas to vapor collection chamber 123 controlled to prevent entry of the reactive atmosphere through the discharge openings.

Although the present invention has been described hereabove with respect to certain embodiments thereof, those skilled in the art will appreciate that changes and modifications can be made thereto without departing from the spirit and scope of the invention as set forth in the appended claims.

We claim:

1. Apparatus for forming particles of a material, comprising:
   a) a chamber having a gaseous atmosphere therein,
   b) an evaporator having an evaporation chamber communicated to said chamber by a discharge opening,
   c) means for heating the material in said evaporation chamber to generate vapor of said material therein proximate said discharge opening, and
   c) means for supplying carrier gas to said evaporation chamber in a manner to carry said vapor through said discharge opening into said chamber as a gaseous jet for entraining said gaseous atmosphere for quenching said vapor to form particles in said jet.

2. The apparatus of claim 1 wherein said evaporator comprises an evaporator housing having a lower supply opening to which solid material is supplied for melting and evaporation in said evaporation chamber at a region remote from said supply opening.

3. The apparatus of claim 2 wherein said discharge opening is disposed above a melted region of said solid material.

4. The apparatus of claim 2 wherein said means for heating said material comprises means for heating said evaporator housing in a manner to establish a temperature gradient therealong to provide a melted region of said material proximate said discharge opening and a solid region of said material proximate said supply opening.

5. The apparatus of claim 1 wherein said means for supplying said carrier gas is communicated to said evaporation chamber above said discharge opening.

6. The apparatus of claim 1 wherein said evaporator housing comprises an elongated tubular member having a lower supply opening to which solid material is supplied and an upper opening communicated to the carrier gas supply means, said discharge opening being disposed between said lower supply opening and said upper opening above a melted region of said material.

7. The apparatus of claim 1 wherein said evaporator housing comprises first and second lower tubular sections communicated to a common third upper tubular vapor collection section, said first and second tubular sections having a respective lower region to which respective first and second materials are supplied to the respective first and second tubular sections, first and second means for heating the respective first and second tubular sections to generate a first vapor comprising said first material in said first tubular section and a second vapor comprising said second material in said second tubular section, said third vapor collection tubular section including an upper region communicated to the carrier gas supply means and a discharge opening disposed between said upper region and said junction wherein said carrier gas carries said first and second vapors together through said discharge opening as said gaseous jet.

8. The apparatus of claim 1 further including a second housing disposed about said evaporator housing, said second housing having a second discharge opening in registry with said discharge opening for discharging said gaseous jet through said second discharge opening to said chamber, said second housing comprising a material different from that of said evaporator housing and substantially non-reactive with said gaseous atmosphere in said chamber.

9. The apparatus of claim 8 wherein said evaporator housing comprises a carbon based material and said second housing comprises a ceramic material.

10. The apparatus of claim 1 wherein said gaseous atmosphere is reactive with said vapor.

11. The apparatus of claim 10 wherein said gaseous atmosphere includes a reactant selected from the group consisting of O-bearing gas, C-bearing gas, N-bearing gas, and B-bearing gas.

12. Method of making nanoparticles of a material, comprising evaporating the material in an evaporation chamber communicated by a discharge opening to a chamber having a gaseous atmosphere therein, introducing carrier gas into said evaporation chamber to carry vapor of said material in said evaporation chamber through said discharge opening into said chamber as a gaseous jet, and entraining said gaseous atmosphere in said gaseous jet for quenching said vapor to form nanoparticles.

13. The method of claim 12 wherein solid material is supplied at a feedrate to a supply opening to said evaporation chamber, melted at an end region remote from said supply opening, and evaporated at the end region at an evaporation rate equal to the feed rate of said solid material.

14. The method of claim 13 wherein said solid material is fed to an evaporator housing that is heated to establish a temperature gradient along said housing to provide a melted region of said material proximate said discharge opening and a solid region of said material proximate said supply opening.

15. The method of claim 12 wherein an inert or non-reactive carrier gas is introduced to the evaporation chamber above the discharge opening.

16. The method of claim 12 wherein said gaseous atmosphere in said chamber is reactive with said vapor of said material.

17. Method of making nanoparticles, comprising evaporating a first material in a first evaporation chamber, evaporating a second material in a second evaporation chamber, communicating the first and second evaporation chambers to a common third vapor collection chamber communicated by a discharge opening to a chamber having a gaseous atmosphere therein, introducing carrier gas into said vapor collection chamber in a manner to carry vapors of said first material and second material together from said vapor collection chamber through said discharge opening into said chamber as a gaseous jet, and entraining said gaseous atmosphere in said gaseous jet for quenching said vapors to form nanoparticles.

18. The method of claim 17 wherein solid first material is supplied to said first evaporation chamber to a first supply opening, melted at an end region remote from the supply opening, and evaporated at the end region and wherein solid second material is supplied to said second evaporation chamber to a second supply opening, melted at an end region remote from the second supply opening, and evaporated at the end region, wherein vapors of said first and second materials rise and collect in said vapor collection chamber.

19. The method of claim 17 wherein said solid first material is fed to a first tubular evaporator housing that is heated to establish a temperature gradient along said housing to provide a melted region of said first material proximate said discharge opening and a solid region of said first material proximate said first supply opening and said solid second material is fed to a second tubular evaporator housing that is heated to establish a temperature gradient along said housing to provide a melted region of said second material proximate said discharge opening and a solid region of said second material proximate said second supply opening.

20. The method of claim 17 wherein an inert or non-reactive carrier gas is introduced to said vapor collection chamber above the discharge opening.

21. The method of claim 17 wherein a first metal is evaporated in said first evaporation chamber and a second metal having a different vapor pressure is evaporated in said second evaporation chamber.

22. Evaporator for forming vapor of a material, comprising a tubular evaporator housing having an evaporation chamber therein and a vapor discharge opening, means for heating the material in said evaporation chamber to generate vapor of said material therein proximate said discharge opening, and means for supplying carrier gas to said evaporation chamber in a manner to carry said vapor through said discharge opening as a gaseous jet.

23. The evaporator of claim 22 wherein said evaporator housing includes a supply opening to which solid material is fed for melting and evaporation in said evaporation chamber.

24. The evaporator of claim 22 wherein said discharge opening is disposed above a melted end region of said solid material.

25. The evaporator of claim 22 wherein said means for supplying said carrier gas is communicated to said evaporation chamber above said discharge opening.

26. The evaporator of claim 22 wherein said means for heating said material comprises means for passing an electrical current through said evaporator housing.

27. The evaporator of claim 22 wherein said means for heating said material comprises means for inductively heating said evaporator member.

28. The evaporator of claim 22 wherein said evaporator housing comprises an elongated tube having a lower region to which said material is supplied and upper region communicated to the carrier gas supply means, said discharge opening being disposed between the lower and upper regions.

29. The evaporator of claim 22 wherein said evaporator housing comprises first and second lower tubular sections communicated at a junction to a common third upper tubular vapor collection section, said first and second tubular sections having a respective lower region to which respective first and second materials are supplied to the respective first and second tubular sections, first and second means for heating the respective first and second tubular sections to generate a first vapor comprising said first material in said first tubular section and a second vapor comprising said second material in said second tubular section, said vapor collection section including an upper region communicated to the carrier gas supply means and said discharge opening disposed between said upper region and said first and second tubular sections wherein said carrier gas carries said first and second vapors together through said discharge opening as a gaseous jet.

30. The evaporator of claim 22 further including a second housing disposed about said evaporator housing, said second housing having a second discharge opening in registry with said discharge opening for discharging said gaseous jet through said second discharge opening to said chamber, said second housing comprising a tube material different from that of said evaporator housing.

\* \* \* \* \*